US012586736B2

(12) United States Patent
Ariturk et al.

(10) Patent No.: US 12,586,736 B2
(45) Date of Patent: Mar. 24, 2026

(54) MEMS SWITCH

(71) Applicant: TEXAS INSTRUMENTS INCORPORATED, Dallas, TX (US)

(72) Inventors: Gokhan Ariturk, Norman, OK (US); Adam Fruehling, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 349 days.

(21) Appl. No.: 17/900,195

(22) Filed: Aug. 31, 2022

(65) Prior Publication Data

US 2024/0071694 A1 Feb. 29, 2024

(51) Int. Cl.
*H01H 1/00* (2006.01)
*H01H 59/00* (2006.01)
*H01P 1/12* (2006.01)

(52) U.S. Cl.
CPC ...... *H01H 1/0036* (2013.01); *H01H 59/0009* (2013.01); *H01P 1/12* (2013.01); *H01H 2001/0084* (2013.01)

(58) Field of Classification Search
CPC ..................... H01H 1/0036; H01H 2001/0084
See application file for complete search history.

(56) References Cited

U.S. PATENT DOCUMENTS 6,800,820 B1 10/2004 Liu et al.
7,253,079 B2 8/2007 Hanson et al.
8,592,876 B2 11/2013 Ding et al.
8,659,366 B2 2/2014 Rofougaran
10,508,025 B2 12/2019 Akiyama et al.
2013/0154762 A1 6/2013 Rofougaran et al.
2014/0009244 A1* 1/2014 Pavageau .................. B81B 5/00 333/105
2014/0291136 A1* 10/2014 Shimooka ................ H01G 5/16 200/600
2015/0021149 A1* 1/2015 Sun .......................... H01H 1/10 200/275
2015/0311003 A1* 10/2015 Fitzgerald .......... H01H 59/0009 200/181
2018/0261415 A1* 9/2018 Koul ..................... H01P 1/2005
2020/0321166 A1* 10/2020 Stefanini ............. B81C 1/00134
2021/0202196 A1* 7/2021 Gudeman .............. H01H 50/36

* cited by examiner

*Primary Examiner* — Evren Seven
(74) *Attorney, Agent, or Firm* — Zhenhai Fu; Frank D. Cimino

(57) ABSTRACT

A microelectromechanical system (MEMS) switch implemented with a coplanar waveguide. The MEMS switch includes an input terminal, an output terminal. The MEMS switch includes a beam extending between the input terminal and the output terminal. The beam includes a first edge and a second edge coupled to a gate of the MEMS switch. The beam includes a third edge proximate the input terminal. The first edge includes a first set of finger contacts proximate a first corner of the beam and a second set of finger contacts proximate a second corner of the beam. The beam includes a fourth edge proximate the output terminal, the fourth edge opposing the third edge. The MEMS switch has a first anchor coupled to the input terminal. The first anchor includes a first segment extending from a region proximate the input terminal to a region overlying the first set of finger contacts.

23 Claims, 5 Drawing Sheets

MEMS SWITCH

TECHNICAL FIELD

This description relates to a microelectromechanical systems (MEMS) switch implemented with a coplanar waveguide.

BACKGROUND

Microelectromechanical systems (MEMS) describes a manufacturing technology used to create microscale integrated devices or systems that combine mechanical and electrical components. These devices and systems have the ability to sense, control and actuate on the micro scale, and generate effects on the macro scale.

A coplanar waveguide is a type of electrical planar transmission line. In some examples, a coplanar waveguide is fabricated using printed circuit board technology, and is used to convey microwave-frequency signals. Additionally or alternatively, on a smaller scale, coplanar waveguide transmission lines are also built into monolithic microwave integrated circuits (MIMICs). In general, a coplanar waveguide is formed with a median metallic strip separated by two narrow slits from a ground plane.

SUMMARY

A first example relates to a microelectromechanical system (MEMS) switch that is implemented with a coplanar waveguide. The MEMS switch includes an input terminal, and an output terminal, spaced apart from the input terminal. The MEMS switch also includes a beam extending between the input terminal and the output terminal of the MEMS switch. The beam includes a first edge and a second edge coupled to a gate of the MEMS switch. The beam includes a third edge proximate the input terminal, the first edge includes a first set of finger contacts proximate a first corner of the beam and a second set of finger contacts proximate a second corner of the beam. The beam also includes a fourth edge proximate the output terminal, the fourth edge opposing the third edge. The MEMS switch includes a first anchor coupled to the input terminal. The first anchor has a first segment extending from a region proximate the input terminal to a region overlying the first set of finger contacts of the beam. The first anchor has a second segment spaced apart from the first segment by an aperture in the first anchor, the second segment extending from the region proximate the input terminal to a region overlying the second set of finger contacts of the beam. A second anchor of the MEMS switch waveguide is coupled to the output terminal of the MEMS switch and to the second edge of the beam.

A second example relates to a MEMS switch that includes an input terminal. The input terminal is coupled to an anchor having an aperture that separates a first segment of the anchor and a second segment of the anchor. The MEMS switch also includes an output terminal, spaced apart from the input terminal and a beam coupled to the output terminal and a gate, the beam extending from a region proximate the output terminal to a region proximate the input terminal. The beam is configured to responsive to assertion of a control signal at a gate of the MEMS switches, contact the anchor to establish a current path between the input terminal and the output terminal. The beam is also configured to responsive to deassertion of the control signal at the gate, disconnect from the anchor to galvanically isolate the input terminal from the output terminal.

A third example relates to a system including a single pole double throw (SPDT) switch. The system includes a MEMS switch having a first anchor, a first beam, a first gate, a first input terminal and a first output terminal, in which the first anchor has a first aperture between a first segment of the first anchor and a second segment of the first anchor, the first input terminal is coupled to the first anchor. The first beam is configured to responsive to assertion of a first control signal at the first gate, contact the first anchor to establish a first current path between the first input terminal and the first output terminal. The first beam is also configured to responsive to deassertion of the first control signal at the first gate, disconnect from the first anchor to galvanically isolate the first input terminal from the first output terminal. The system additionally includes a second MEMS switch having a second anchor, a second beam, a second gate, a second input terminal and a second output terminal, in which the second anchor has a second aperture between a first segment of the second anchor and a second segment of the second anchor, the second input terminal is coupled to the second anchor. The second beam is configured to responsive to assertion of a second control signal at the second gate, contact the second anchor to establish a second current path between the second input terminal and the second output terminal. The second beam is also configured to responsive to deassertion of the second control signal at the second gate, disconnect from the second anchor to galvanically isolate the second input terminal from the second output terminal. The system additionally includes a receiver coupled to the first output terminal, a transmitter coupled to the second input terminal. The system further includes an antenna coupled to the first input terminal and to the second output terminal and a controller configured to provide the first control signal and the second control signal.

DETAILED DESCRIPTION

Figure 1A:
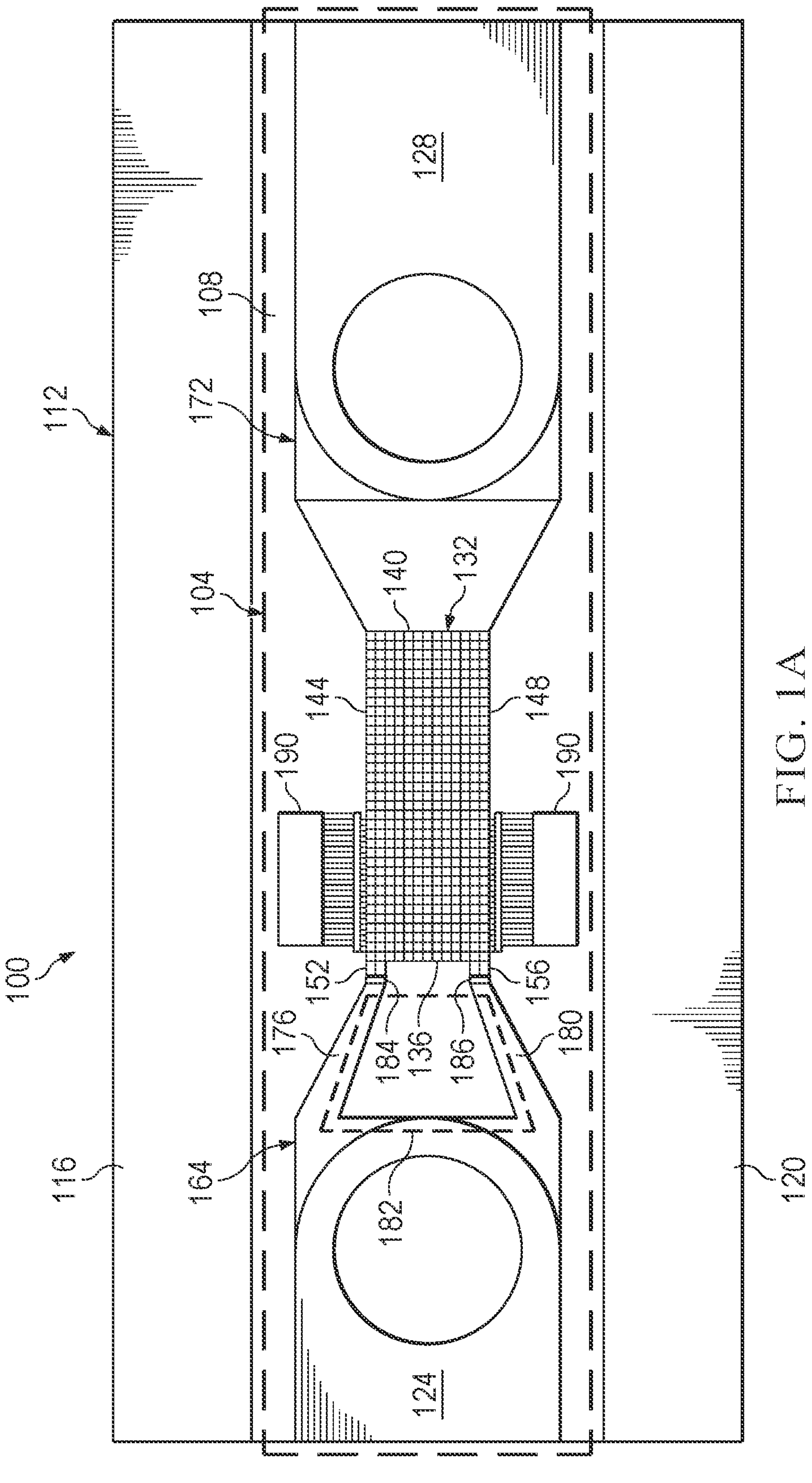
FIG. 1A illustrates an overhead view of a microelectromechanical systems (MEMS) switch.

This description relates to a microelectromechanical systems (MEMS) switch implemented with a coplanar waveguide. The coplanar waveguide of the MEMS switch includes an input terminal and an output terminal. The input terminal is configured to be coupled to a signal source, and the output terminal is configured to be coupled to a load. In this description, the term "coupled", or "couples" means either an indirect or a direct connection. As one example, the input terminal is coupled to a radio frequency (RF) transmitter (e.g., a signal source) and the output terminal is coupled to an antenna (e.g., a load). In some such examples, the MEMS switch is a first MEMS switch that operates in concert with the second MEMS switch to form a single pole double throw (SPDT) switch, wherein the input terminal of the second MEMS switch is coupled to the antenna (e.g., a signal source) and the output terminal of the second MEMS switch is coupled to an RF receiver (e.g., a load).

The output terminal of the MEMS switch is spaced apart from the input terminal, and a beam extends in a region between the input terminal and the output terminal of the coplanar waveguide. In some examples, the beam is formed of an aluminum mesh or other conductive material. The beam includes a first edge and a second edge coupled to a gate of the MEMS switch. The beam has a third edge proximate the input terminal. The third edge includes a first set of finger contacts proximate a first corner of the beam and a second set of finger contacts proximate a second corner of the beam. The beam also has a fourth edge proximate the output terminal.

A first anchor is coupled to the input terminal. A second anchor is coupled to the output terminal of the coplanar waveguide and to the second edge of the beam. The first anchor has a first segment extending from a region proximate the input terminal to a region overlying the first set of finger contacts of the beam and a second segment spaced apart from the first segment, the second segment extending from the region proximate the input terminal to a region overlying the second set of finger contacts of the beam. Further, the first anchor has a dovetail shaped (e.g., trapezoidal shaped) aperture that separates the first segment from the second segment of the first anchor. Accordingly, the first segment and the second segment extend from the input terminal toward the third edge of beam at complementary angles (e.g., opposite angles).

The MEMS switch is normally opened, and electrically controllable. More particularly, a state of the MEMS switch is controllable with a control signal provided to the gate of the MEMS switch. In some examples, the control signal is provided by a controller (e.g., a microcontroller). In other examples, other devices provide the control signal. The MEMS switch is a normally open switch. In an open state, the input terminal and the output terminal of the MEMS switch are galvanically isolated. Assertion (such as a high logic state) of the control signal applies a bias voltage (e.g., about 40 volts (V) or more) to the gate of the MEMS switch. The bias voltage causes the beam to move such that the first and second set of finger contacts contact the first segment and the second segment of the first anchor, thereby establishing a current path between the input terminal and the output terminal.

As described herein, the first anchor of the MEMS switch includes the aperture (e.g., having a dovetail shape) separating the first segment from the second segment. This aperture reduces the surface area of the first anchor that overlies the beam. Instead, the ends of the first segment and the second segment (which also include finger contacts) overlay the beam. Accordingly, inclusion of the first aperture reduces a parasitic capacitance between the first anchor and the beam, thereby improving isolation between the input terminal and the output terminal during intervals of time that the MEMS switch is in the open state. This isolation degrades as a function of frequency. However, inclusion of the aperture curtails this degradation, such that at frequencies of about 40 gigahertz (GHz) or more, inclusion of the aperture improves the isolation by about 1 decibels (dB) or more. Further, analysis of a surface current (Jsurf) on the first anchor during intervals where the MEMS switch is in the closed state reveals that most of the current flows along a periphery of the first anchor (whether or not the first anchor includes the aperture). Therefore, inclusion of the aperture does not significantly impact an insertion loss of the MEMS switch. More particularly, at the higher frequencies of 40 GHz, inclusion of the aperture adds an additional insertion loss of about 0.06 dB. Thus, for a relatively small increase in insertion loss (e.g., about 0.6 dB), a significant improvement to the isolation (e.g., about 1 dB or more) of the MEMS switch is achieved by including the aperture.

Figure 1B:
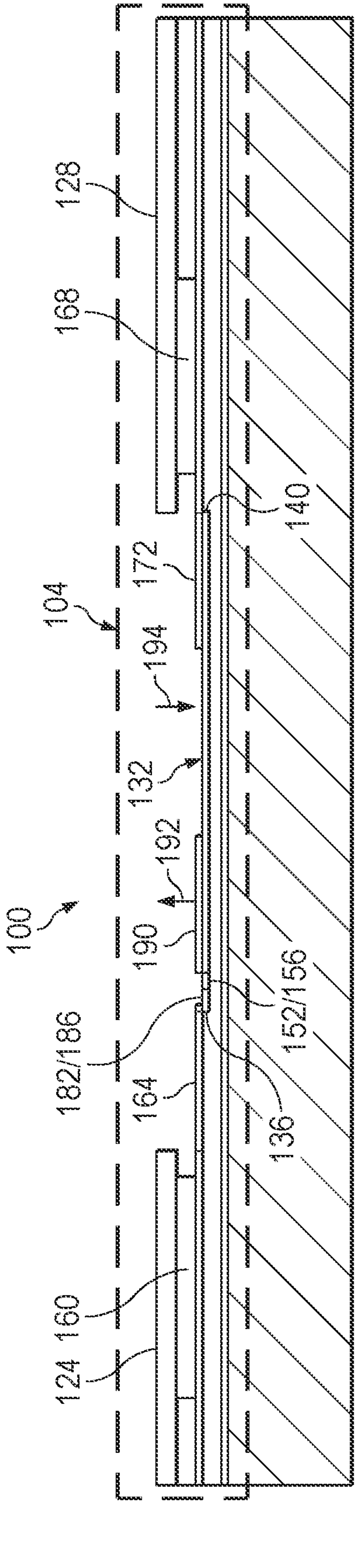
FIG. 1B illustrates a cross-sectional side view of the MEMS switch.

FIGS. 1A and 1B illustrates a diagram of a MEMS switch 100 that is implemented with a coplanar waveguide 104. More specifically, FIG. 1A illustrates a overhead view of the MEMS switch 100 and FIG. 1B illustrates a cross-sectional side view of the MEMS switch 100. The MEMS switch 100 is normally opened, and electrically controllable. The MEMS switch 100 can be implemented, for example, as an integrated circuit (IC) package. The coplanar waveguide 104 is formed in a groove 108 of a substrate 112. The substrate 112 includes a first return conductor 116 and a second return conductor 120 situated adjacent to the groove 108.

The coplanar waveguide 104 includes an input terminal 124 and an output terminal 128. The input terminal 124 is configured to be coupled to a signal source, such as a transmitter or an antenna. The output terminal 128 is configured to be coupled to a load, such as a receiver or an antenna. The input terminal 124 and the output terminal 128 are spaced apart from each other.

A beam 132 is situated in the region between the input terminal 124 and the output terminal 128. The beam 132 is formed of a mesh of conductive material, such as aluminum. The 132 has a rectangular shape, with a first edge 136, a second edge 140, a third edge 144 and a fourth edge 148. The first edge 136 is proximate the input terminal 124 and the second edge 140, which opposes the first edge 136 is proximate the output terminal 128. The third edge 144 and the fourth edge 148 oppose each other, and extend between the input terminal 124 and the output terminal 128. A first set of finger contacts 152 is formed at a corner of the first edge 136 and the third edge 144 of the beam 132. A second set of finger contacts 156 is formed at a corner of the first edge 136 and the fourth edge 148. In some examples, there are four (4) or more finger contacts in the first set of finger contacts 152 and the second set of finger contacts 156. In other examples, there are more or less finger contacts in the first set of finger contacts 152 and the second set of finger contacts 156.

The input terminal 124 includes a via 160 that couples the input terminal 124 to a first anchor 164. The output terminal 128 also includes a via 168 that couples the output terminal 128 to a second anchor 172. The second anchor 172 is coupled to the second edge 140 of the beam 132. Moreover, the second anchor 172 has a parallelogram shape that tapers from the output terminal 128 toward the second edge 140 of the beam 132.

The first anchor 164 has a first segment 176 and a second segment 180. An aperture 182 in the first anchor 164 separates the first segment 176 from the second segment 180. The first segment 176 of the first anchor 164 extends at a first angle from the input terminal 124 to a region that overhangs the first set of finger contacts 152 of the beam 132. Similarly, the second segment 180 extends at a second angle from the input terminal 124 to a region that overhangs the second set of finger contacts 156, and the second angle is a complement (opposite) of the first angle. Accordingly, the aperture 182 has a dovetail shape in the illustrated example. Further, the first segment 176 includes a third set of finger contacts 184 that overhang the first set of finger contacts 152 of the beam 132, and the second segment 180 includes a fourth set of finger contacts 186 that overhang the second set of finger contacts 156. In some examples, there are an equal number of finger contacts in the first set of finger contacts 152, the second set of finger contacts 156, the third set of finger contacts 184 and the fourth set of finger contacts 186.

The third edge 144 and the fourth edge 148 of the beam 132 are coupled to a gate 190 for the MEMS switch 100. The gate 190 has two (2) terminals. Application of a bias voltage (e.g., about 40 volts (V) or more) across the gate 190 causes the beam 132 to move in a direction indicated by an arrow 192. Removal of the bias voltage causes the beam 132 to move in a direction indicated by an arrow 194 to decouple the beam 132 from the first anchor 164. Stated differently, applying the bias voltage applied to the gate 190 causes the beam 132 to move from a first position to a second position. The input terminal 124 and the output terminal 128 are galvanically isolated in the first position, and a current path is provided between the input terminal 124 and the output terminal 128 in the second position, such that the MEMS switch 100 is in an open state in the first position and the MEMS switch 100 is in a closed state in the second position.

In operation, the MEMS switch 100 is a normally opened switch such that the MEMS switch 100 is in the open state in situations where no bias voltage is applied across the gate 190. In the open state, the first set of finger contacts 152 and the second set of finger contacts 156 of the beam 132 are spaced apart from, and galvanically isolated from the third set of finger contacts 184 and the fourth set of finger contacts 186 of the first segment 176 and the second segment 180, respectively, of the first anchor 164. Accordingly, during time intervals where the MEMS switch 100 is in the open state, there is no current path between the input terminal 124 and the output terminal 128.

Conversely, during time intervals that the vias voltage is applied across the gate 190, the MEMS switch 100 is in a closed state. More specifically, as described herein, application of the bias voltage to the gate 190 causes the beam 132 to move in the direction indicated by the arrow 192. Moving the beam 132 in the direction indicated by the arrow 192 causes the first set of finger contacts 156 of the beam 132 to contact the third set of finger contacts 184 of the first segment 176 of the first anchor 164 and causes the second set of finger contacts 156 to contact the fourth set of finger contacts 186 of the second segment 180. Accordingly, application of the bias voltage across the gate 190 causes the first anchor 164 to contact the beam 132 to provide a current path between the input terminal 124 and the output terminal 128 of the MEMS switch 100.

Inclusion of the aperture 182 curtails parasitic capacitance between the beam 132 and the first anchor 164 during intervals where the MEMS switch 100 is in the open state. For example, the aperture 182 reduces a surface area between the first anchor 164 and the region of the beam 132 proximate the first edge 136 of the beam 132. Reducing this surface area reduces parasitic capacitance between the beam 132 and the first anchor 164 in the open state.

Figure 2:
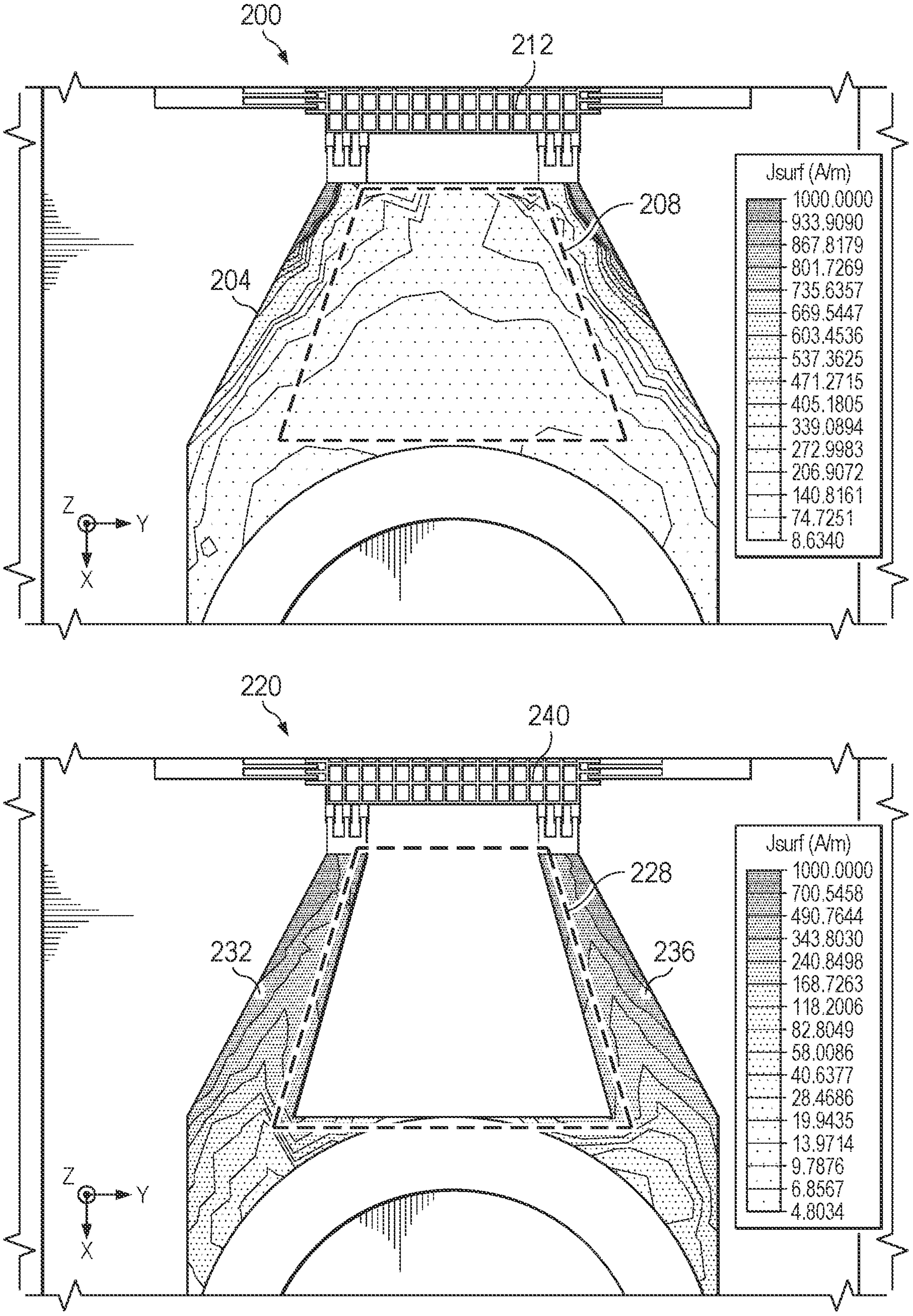
FIG. 2 illustrates heat maps characterizing a surface current of anchors for MEMS switches.

FIG. 2 illustrates a first heat map 200 and a second heat map 220 of anchors for a MEMS switch, such as the MEMS switch 100 of FIGS. 1A and 1B. The first heat map 200 implements a baseline anchor 204 (e.g., using a conventional approach), such as the first anchor 164 of FIGS. 1A and 1B, where the aperture 182 is omitted. The baseline anchor 204 is proximate an edge of a beam 212 (e.g., the beam 132 of FIGS. 1A and 1B). Conversely, the second heat map 220 implements a modified anchor 224, such as the first anchor 164 of FIGS. 1A and 1B. The modified anchor 224 includes an aperture 228 (e.g., the aperture 182 of FIGS. 1A and 1B) between a first segment 232 (e.g., the first segment 176 of FIGS. 1A and 1B) and a second segment 236 (e.g., the second segment 180 of FIGS. 1A and 1B). The modified anchor 224 is proximate an edge of a beam 240 (e.g., the beam 132 of FIGS. 1A and 1B).

The first heat map 200 characterizes a surface current density (Jsurf) in amperes per meter (A/m) of the baseline anchor 204 where the MEMS switch is in a closed state. The first heat map 200 demonstrates that in situations where the aperture 182 is omitted, a periphery of the baseline anchor 204 has a greatest surface current density. Conversely, an interior region 208 of the baseline anchor 204 characterized by the first heat map 200 has a relatively low surface current density.

The second heat map 220 characterizes a surface current density (Jsurf) in A/m of the modified anchor 224 that includes the aperture 228. As is demonstrated, the first segment 232 and the second segment 236 have relatively high surface current densities. Comparing the first heat map 200 with the second heat map 220, inclusion of the aperture 228 (in the modified anchor 224 of the second heat map 220) does not greatly impact the overall surface current density. Accordingly, because the surface current density is low in the interior region 208 of the baseline anchor 204 corresponding to the first heat map 200, the removal of the interior region 208, thereby forming the modified anchor 224 with the aperture 228 has a relatively small impact on a resistance (which corresponds to insertion loss in the closed state) in a MEMS switch employing the modified anchor 224. For example, there are multiple metal layers in the MEMS switch employing the baseline anchor 204 or the modified anchor 224 that produce a parasitic parallel-plate capacitance effect. For example, the capacitance between the beam 212 and the baseline anchor 204 (in the open state) is greater than the capacitance between the beam 240 and the modified anchor 224 (in the open state) due to the inclusion of the aperture 228.

Figure 3:
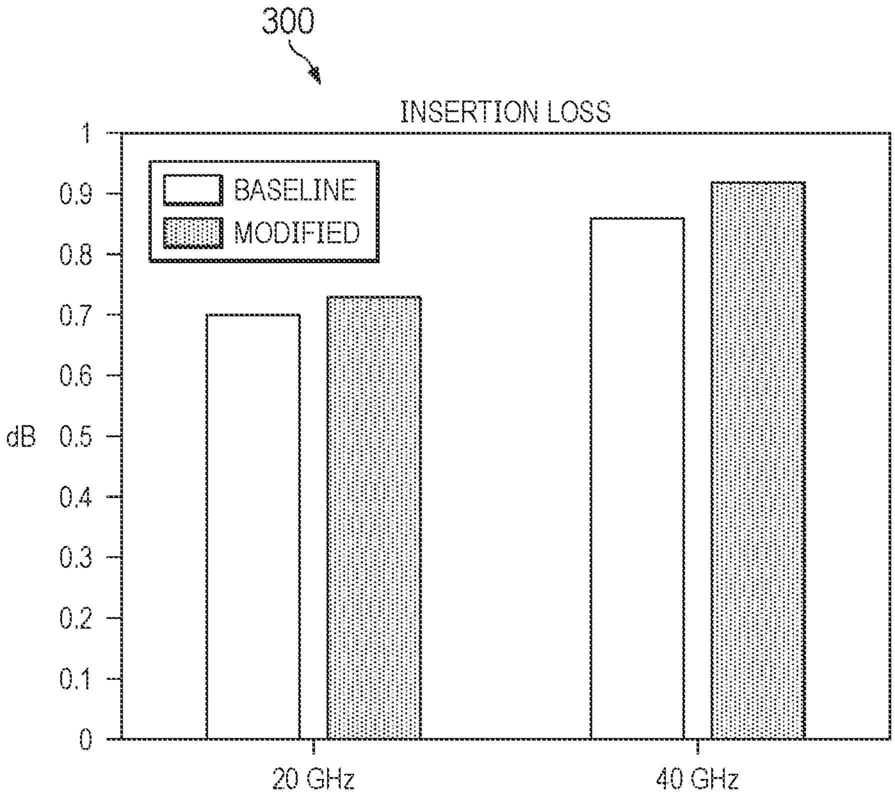
FIG. 3 illustrates graphs plotting an insertion loss and isolation of MEMS switches.
Figure 3:
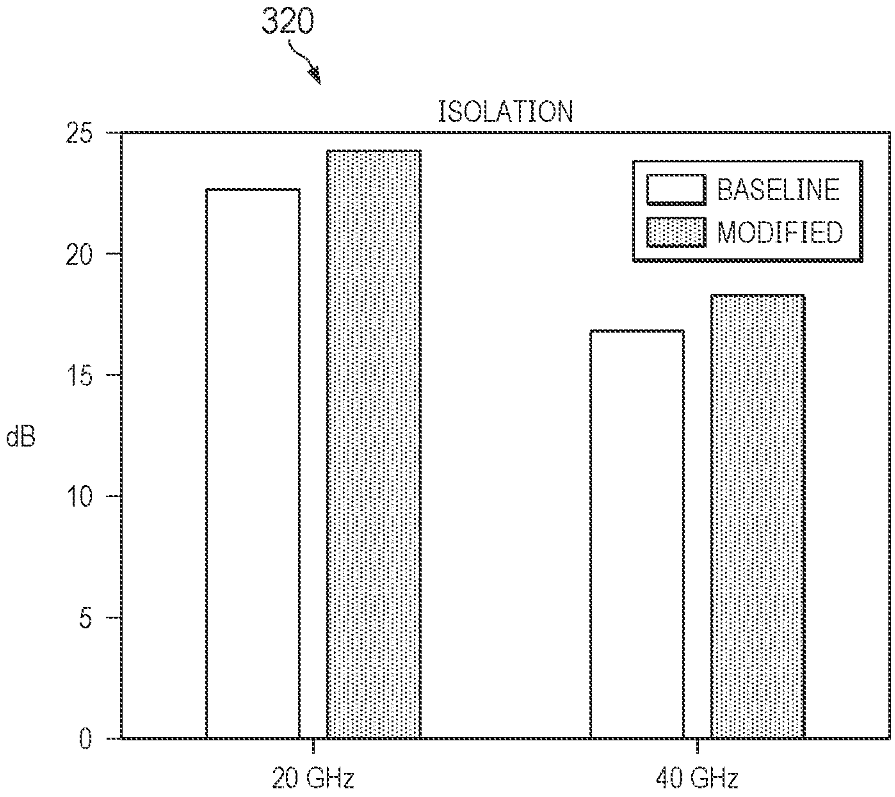

FIG. 3 illustrates a first bar graph 300 that plots insertion loss, in decibels (dB) for a MEMS switch with a baseline anchor (e.g., the baseline anchor 204 of FIG. 2) and a MEMS switch with a modified anchor (e.g., the modified anchor 224 of FIG. 2 and/or the first anchor 164 of FIGS. 1A and 1B). In the first bar graph 300, it is presumed that the MEMS switch is in the closed state, and that current is flowing between an input terminal (e.g., the input terminal 124 of FIGS. 1A and 1B) and an output terminal (e.g., the output terminal 128 of FIGS. 1A and 1B). The first bar graph 300 includes the insertion loss for an input signal at 20 gigahertz (GHz) and an input signal at 40 GHz.

As illustrated by the first bar graph 300, inclusion of an aperture, such as the aperture 228 of FIG. 2 and/or the aperture 182 of FIGS. 1A and 1B incurs an additional insertion loss of about 0.03 dB at 20 GHz (e.g., 0.7 dB for the baseline anchor compared to 0.73 dB for the modified anchor) and about 0.06 dB at 40 GHz (e.g., 0.86 dB for the baseline anchor compared to 0.92 dB for the modified anchor).

FIG. 3 also illustrates a second bar graph 320 that plots isolation, in dB for a MEMS switch with the baseline anchor and a MEMS switch with the modified anchor. In the second bar graph 320, it is presumed that the MEMS switch is in the open state, and that current is prevented from flowing between the input terminal and the output terminal. The second bar graph 320 includes the isolation for the input signal at 20 GHz and the input signal at 40 GHz.

As illustrated by the second bar graph 320, inclusion of an aperture in the modified anchor improves isolation by about 1.59 dB at 20 GHz (e.g., 22.65 dB for the baseline anchor compared to 24.24 dB for the modified anchor) and improves isolation by about 1.44 dB at 40 GHz (e.g., 16.82 dB for the baseline anchor compared to 18.26 dB for the modified anchor). As illustrated in the second bar graph 320, as the frequency increases, the isolation degrades. However, employment of the modified anchor curtails this degradation.

Accordingly, the first bar graph 300 and the second bar graph 320 demonstrate that at a cost of about 0.03 dB of insertion loss at 20 GHz, isolation is improved by about 1.59 dB. Also, the first bar graph 300 and the second bar graph 320 demonstrate that at a cost of about 0.06 dB in insertion loss at 40 GHz, isolation is improved by 1.44 dB. Thus, at both frequencies, 20 GHz and 40 GHz, the isolation of the MEMS switched is improved at a nearly negligible cost in insertion loss.

Referring back to FIGS. 1A and 1B, as demonstrated by FIGS. 2-3, the MEMS switch 100 provides a relatively low insertion loss (e.g., about 0.7 dB at 20 GHz and about 0.86 dB at 40 GHz) during intervals of time where the MEMS switch 100 is in the open state. Also, the MEMS switch 100 provides a relatively high isolation (e.g., 22.65 dB at 20 GHz and about 16.82 dB at 40 GHz) during intervals of time where the MEMS switch 100 is in the open state.

Figure 4:
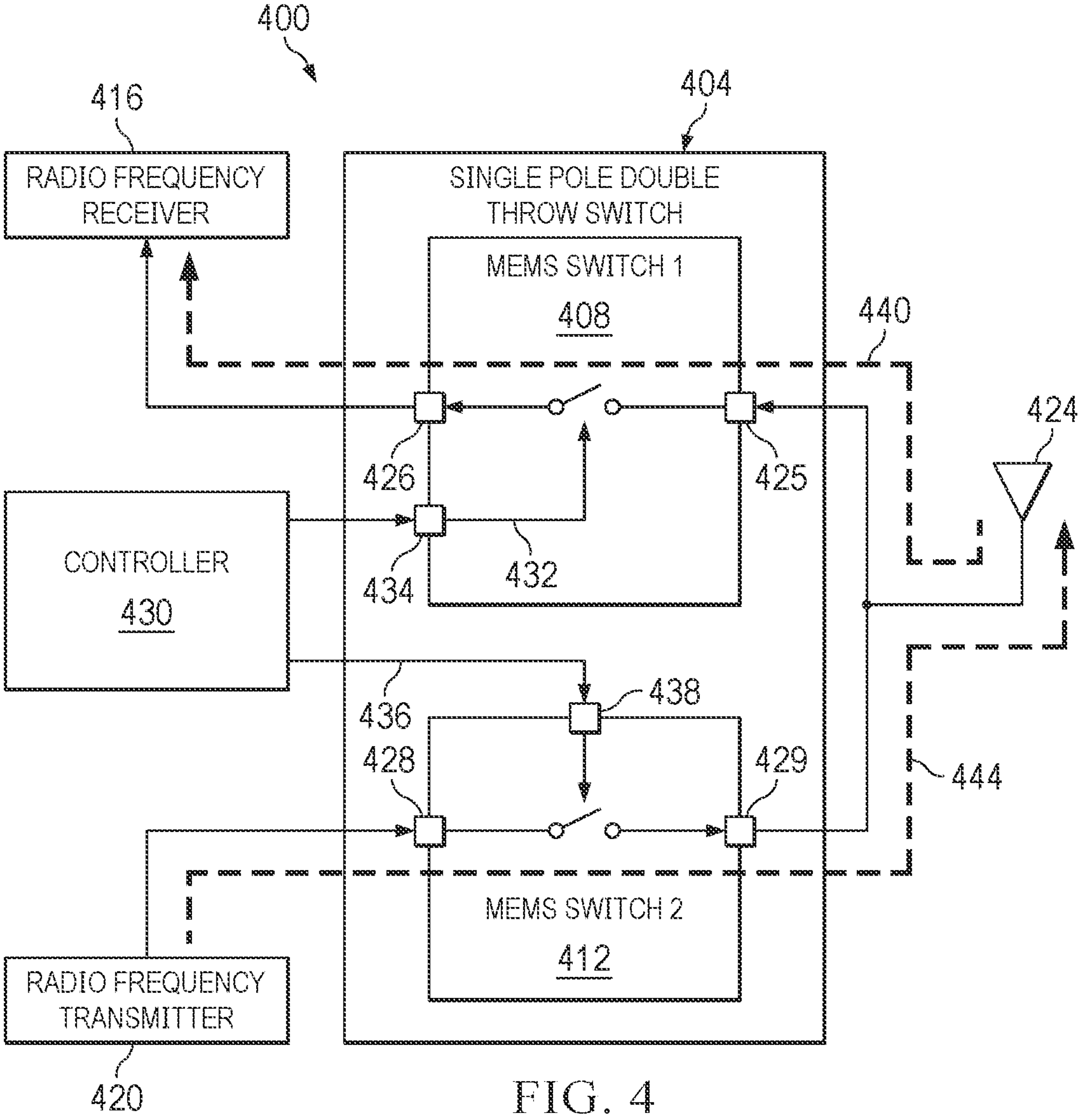
FIG. 4 illustrates a block diagram of a radio frequency (RF) transceiver that employs a single pole double throw (SPDT) switch that is implemented with MEMS switches.

FIG. 4 illustrates a block diagram of a system 400 that employs a single pole double throw (SPDT) switch 404. In some examples, the SPDT switch 404 is implemented on an integrated circuit (IC) package. The SPDT switch 404 includes two MEMS switches, namely, a first MEMS switch 408 (MEMS SWITCH 1) and a second MEMS switch 412 (MEMS SWITCH 2). The first MEMS switch 408 and the second MEMS switch 412 are implemented as instances of the MEMS switch 100 of FIGS. 1A and 1B. Thus, the first MEMS switch 408 and the second MEMS switch 412 are electrically controllable, normally open switches.

In the example illustrated, the system 400 is employable to implement a radio frequency (RF) transceiver that includes an RF receiver 416 and an RF transmitter 420 that communicate with an antenna 424 (e.g., a load, more generally). However, the SPDT switch 404 is employable in nearly any system where high isolation is needed. In some examples, the RF receiver 416 is configured to receive an RF signal from the antenna 424 that has a frequency of about 50 GHz to about 80 GHz. Similarly, the RF transmitter 420 is configured to transmit a signal to the antenna 424 that has a frequency of about 50 GHz to about 80 GHz. In other examples, other frequencies are employable.

In the example illustrated, the antenna 424 is coupled to an input terminal 425 of the first MEMS switch 408 and the RF receiver 416 is coupled to an output terminal 426 of the first MEMS switch 408. Also, the RF transmitter 420 is coupled to an input terminal 428 of the second MEMS switch 412 and the antenna 424 is coupled to an output terminal 429 of the second MEMS switch 412.

The SPDT switch 404 has two modes of operation, namely a receive mode and a transmit mode. A controller 430 (e.g., a microcontroller) controls the mode of operation of the SPDT switch 404. In some examples, the controller 430 is implemented in an IC package that communicates with the SPDT switch 404. In other examples, the controller 430 is integrated with the SPDT switch 404. The controller 430 includes embedded instructions for controlling a state of the SPDT switch 404. More particularly, the controller 430 provides a first control signal 432 to a gate 434 of the first MEMS switch 408 that controls a state of the first MEMS switch 408. Assertion of the first control signal 432 applies a bias voltage (e.g., a DC voltage of about 40 V or more) across a gate (e.g., the gate 190 of FIGS. 1A and 1B) to transition the first MEMS switch 408 from an open state to a closed state. Deassertion (such as a low logic state) of the first control signal 432 removes the bias voltage and transitions the first MEMS switch 408 to the open state. Similarly, the controller 430 provides a second control signal 436 to a gate 438 of the second MEMS switch 412 that controls a state of the second MEMS switch 412. Assertion of the second control signal 436 applies a bias voltage (e.g., a DC voltage of about 40 V or more) across a gate (e.g., the gate 190 of FIGS. 1A and 1B) to transition the second MEMS switch 412 from an open state to a closed state. Deassertion of the second control signal 436 removes the bias voltage and transitions the second MEMS switch 412 from the closed state to the open state. The first control signal 432 and the second control signal 436 are complementary signals, such that during time intervals where the first control signal 432 is asserted, the second control signal 436 is deasserted, and vice versa.

The SPDT switch 404 is configured such that in the receive mode, the first control signal 432 is asserted, and the second control signal 436 is deasserted, such that the first MEMS switch 408 is in the closed state and the second MEMS switch 412 is in the open state. Also, the SPDT switch 404 is configured such that in the transmit mode, the first control signal 432 is deasserted and the second control signal 436 is asserted.

In the receive mode, an RF signal received by the antenna 424 flows along a receive path 440 from the antenna 424 through the first MEMS switch 408 (in the closed state) and to the RF receiver 416. Also, in the receive mode, the second MEMS switch 412 is in the open state, such that current does not flow across the second MEMS switch 412. In the transmit mode, an RF signal provided from the RF transmitter 420 flows along a transmit path 444 from the RF transmitter 420 through the second MEMS switch 412 (in the closed state) and to the antenna 424. Also, in the transmit mode, the first MEMS switch 408 is in the open state, such that current does not flow across the first MEMS switch 408.

In operation, because the SPDT switch 404 employs the first MEMS switch 408 and the second MEMS switch 412, high isolation between the RF receiver 416 and the RF transmitter 420 is achieved. More particularly, during intervals of time that the SPDT switch 404 is in the receive mode, such that the receive path 440 is active, received RF signals are prevented from reaching the RF transmitter 420, which prevents a loss of gain for the MEMS switch 100. Also, during intervals of time that the SPDT switch 404 is in the transmit mode, such that the transmit path 444 is active, signals provided by the RF transmitter 420 are prevented from flowing to the RF receiver 416 avoiding corruption of measurements of the transmitted signal. Moreover, as demonstrated by the second bar graph 320 of FIG. 3, increasing the frequency of the transmitted and received signal degrades the isolation of the first MEMS switch 408 and the second MEMS switch 412, such that an improvement of about 1 dB to about 2 dB (achieved by including the aperture 182 of FIGS. 1A and 1B) provides a significant improvement in performance.

In this description, unless otherwise stated, "about," "approximately" or "substantially" preceding a parameter means being within +/−10 percent of that parameter. Modifications are possible in the described embodiments, and other embodiments are possible, within the scope of the claims.

What is claimed is:

1. A device comprising:

a first terminal;

a second terminal including a first segment and a second segment spaced apart from the first segment; and a beam coupled to the first terminal and including a third segment and a fourth segment, the third segment opposing the first segment, and the fourth segment opposing the second segment.

2. The device of claim 1, further comprising an actuator configurable to cause the third and fourth segments of the beam to move between a first position and a second position, in which the third and fourth segments are spaced from, respectively, the first and second segments when the third and fourth segments are at the first position, and the third and fourth segments are in contact with, respectively, the first and second segments when the third and fourth segments are at the second position.

3. The device of claim 2, wherein an isolation between the first and second terminals is at 24 decibels (dB) or more for a signal having a frequency of 20 gigahertz at the first or second terminal.

4. The device of claim 2, wherein an isolation between the first and second terminals of is at 18 decibels (dB) or more for a signal having a frequency of 40 gigahertz at the first or second terminal.

5. The device of claim 2, wherein the first segment terminates with a first set of finger contacts, the second segment terminates with a second set of finger contacts, the third segment terminates with a third set of finger contacts, and the fourth segment terminates with a fourth set of finger contacts.

6. The device of claim 5, wherein at the first position, the first set of finger contacts are spaced apart from the third set of finger contacts, and the second set of finger contacts are spaced apart from the fourth set of finger contacts.

7. The device of claim 1, wherein the beam extends from the first terminal towards the second terminal along an axis, and each of the first segment and the second segment is angled from the axis.

8. The device of claim 1, wherein the beam includes a metal mesh.

9. The device of claim 1, wherein the first and second terminals and the beam are part of an integrated circuit (IC).

10. A device comprising:

a first terminal;

a second terminal including an opening at an end of the second terminal; and a beam coupled to the first terminal, an end of the beam opposing the opening.

11. The device of claim 10, further comprising an actuator configurable to cause the end of the beam to move between a first position and a second position, in which the end of the beam is spaced from the second terminal when the end of the beam is at the first position, and the end of the beam is in contact with the second terminal when the end of the beam is at the second position.

12. The device of claim 11, wherein the opening has a dovetail shape.

13. The device of claim 11, wherein the actuator is configurable to cause the end of the beam to be at the first position responsive to a bias voltage of 40 volts or higher.

14. The device of claim 10, wherein an isolation between the first and second terminals is at 18 decibels (dB) or more for signal having a frequency of 40 gigahertz at the first or second terminal.

15. The device of claim 10, wherein the beam includes a metal mesh.

16. The device of claim 10, wherein the first and second terminals and the beam are part of an integrated circuit.

17. An apparatus comprising:

a first switch having a first switch terminal, a second switch terminal, a first control terminal, and a first beam coupled to the first or second switch terminal, the first or second switch terminal having a first opening opposing an end of the first beam, at least part of the first beam being movable responsive to a first signal at the first control terminal;

a second switch having a third switch terminal, a fourth switch terminal, a second control terminal, and a second beam coupled to the third or fourth switch terminal, the third or fourth switch terminal having a second opening opposing an end of the second beam, at least part of the second beam being movable responsive to a second signal at the second control terminal;

a receiver coupled to the first switch terminal;

a transmitter coupled to the third switch terminal; and a controller coupled to the first and second control terminals.

18. The apparatus of claim 17, wherein the first and second switches form a single pole double throw switch.

19. The apparatus of claim 17, further comprising a first actuator coupled to the first control terminal and configurable to move at least part of the first beam responsive to the first signal, and a second actuator coupled to the second control terminal and configurable to move at least part of the second beam responsive to the second signal.

20. The apparatus of claim 17, wherein the first switch is configurable to provide an isolation between the first and second switch terminals of 18 decibels (dB) or more for a signal at the first or second switch terminal with a frequency of 40 gigahertz.

21. The device of claim 1, wherein the first and second terminals and the beam are part of a microelectromechanical system (MEMS) switch.

22. The device of claim 1, wherein the first and second terminals and the beam are part of a coplanar waveguide.

23. The apparatus of claim 17, further comprising an antenna coupled to the second and fourth switch terminals.

* * * * *